United States Patent

Philbert et al.

4,028,935

June 14, 1977

[54] METHOD, APPLIANCE AND INSTALLATION FOR THE OPTICAL DETERMINATION OF SMALL DISPLACEMENTS OF POINTS ON THE SURFACE OF A SOLID BODY

[75] Inventors: Michel Eric Philbert, Paris; Jean Marcel Surget, Joinville-le-Pont, both of France

[73] Assignee: Office National d'Etudes et de Recherches Aerospatiales (O.N.E.R.A.), Chatillon, France

[22] Filed: Apr. 1, 1974

[21] Appl. No.: 456,888

[30] Foreign Application Priority Data

Apr. 6, 1973 France .............................. 73.12519

[52] U.S. Cl. .................................. 73/71.3; 356/156
[51] Int. Cl.² ............................................... G01B 9/00
[58] Field of Search ........... 350/102, 103; 250/201; 73/71.3, 71.1, 70, 67.5 H; 356/156, 167

[56] References Cited

UNITED STATES PATENTS

| 2,437,608 | 3/1948 | Long et al. ...................... 73/71.3 X |
| 2,831,394 | 4/1958 | Heenan et al. ...................... 350/103 |
| 3,316,759 | 5/1967 | Rehder ............................ 73/71.3 X |
| 3,364,813 | 1/1968 | McKinney ....................... 73/71.3 X |
| 3,443,072 | 5/1969 | Gibbs ................................... 250/201 |
| 3,606,541 | 9/1971 | Sugano et al. .................. 356/167 X |
| 3,612,890 | 10/1971 | Cornyn et al. ..................... 356/157 |
| 3,706,965 | 12/1972 | Korpel ............................ 73/67.5 H |
| 3,782,176 | 1/1974 | Jacobs ................................. 73/71.3 |
| 3,790,281 | 2/1974 | Kessler et al. .................. 73/67.5 H |
| 3,806,222 | 4/1974 | Knappe ............................. 350/130 |
| 3,833,299 | 9/1974 | Lang ................................... 356/156 |
| 3,873,191 | 3/1975 | Veret ................................. 350/102 |

FOREIGN PATENTS OR APPLICATIONS

| 817,683 | 8/1959 | United Kingdom ................ 73/71.3 |
| 856,006 | 12/1960 | United Kingdom ............... 356/156 |

*Primary Examiner*—Richard C. Queisser
*Assistant Examiner*—Stephen A. Kreitman
*Attorney, Agent, or Firm*—Browdy and Neimark

[57] ABSTRACT

The invention provides a method, an appliance and an installation for the determination of small displacements of points on the surface of a solid body.

A catadioptric covering, such as a catadioptric paint or a piece of a sheet with catadioptric properties is applied on the point of the solid body whose displacement is to be determined, and after illuminating said covering, one determines in a viewing direction different from that of the displacement the variations in the quantity of light received by a photosensitive receiver coming from an image of the said covering in the plane of which is located a knife-edge partly covered by the said image.

21 Claims, 18 Drawing Figures

METHOD, APPLIANCE AND INSTALLATION FOR THE OPTICAL DETERMINATION OF SMALL DISPLACEMENTS OF POINTS ON THE SURFACE OF A SOLID BODY

The invention relates to a method, an appliance and an installation for the determination of small displacements of points on the surface of a solid body.

It is sometimes desired to measure small displacements of points on the surface of a solid body without this latter having mechanical contact with a measuring appliance.

The use of optical appliances might appear to offer a solution of this problem in the case where the surface of the body has very similar reflecting properties to those of a mirror; but it would seem to be excluded a priori for determinations in connection with mechanical components with a surface whose optical properties are very different from those of a mirror.

In this latter case the problem appears to be even more complicated to solve when the shape of the body differs from simple geometrical forms such as the sphere and the direction of the displacement to be measured is not known beforehand.

The invention contemplates the application on the solid body, at the point whose displacement is to be determined, of a catadioptric covering, such as a catadioptric paint or a piece of a sheet with catadioptric properties, that is to say which reflects light in the direction or directions of incidence.

A solid body thus provided at any of its "points" with a catadioptric covering may then be considered as comprising a source of light of predetermined surface area, which is that of the catadioptric covering which it bears, and the invention provides for the determination of the displacement of the point" on the surface of the said body by considering the variations in the position of the image in the said covering, supplied by catadioptric reflection, of a light beam illuminating this latter.

It has been found that, though the surface affecting the light is different from that of the component, since the catadioptric property results from the presence of minuscule cover spheres, the results obtained by reflection on the catadioptric covering are actually those corresponding to the displacements of the body.

The invention is directed to an appliance characterized in that it comprises, on the one hand, means for illuminating the covering with the catadioptric properties, and on the other hand means for deducing information, based on the displacements of the image in the said covering, regarding the displacement of the "point" on the body bearing the said covering.

The invention provides for this purpose a form of embodiment characterized in that it comprises a knife-edge or the like in relation to which the covering image is displaced during the displacement of the body, so that information can be drawn regarding the quantity of light clearing the plane of the knife-edge.

The description which follows, given by way of example, refers to the attached drawing, in which.

Figures 1, 2:
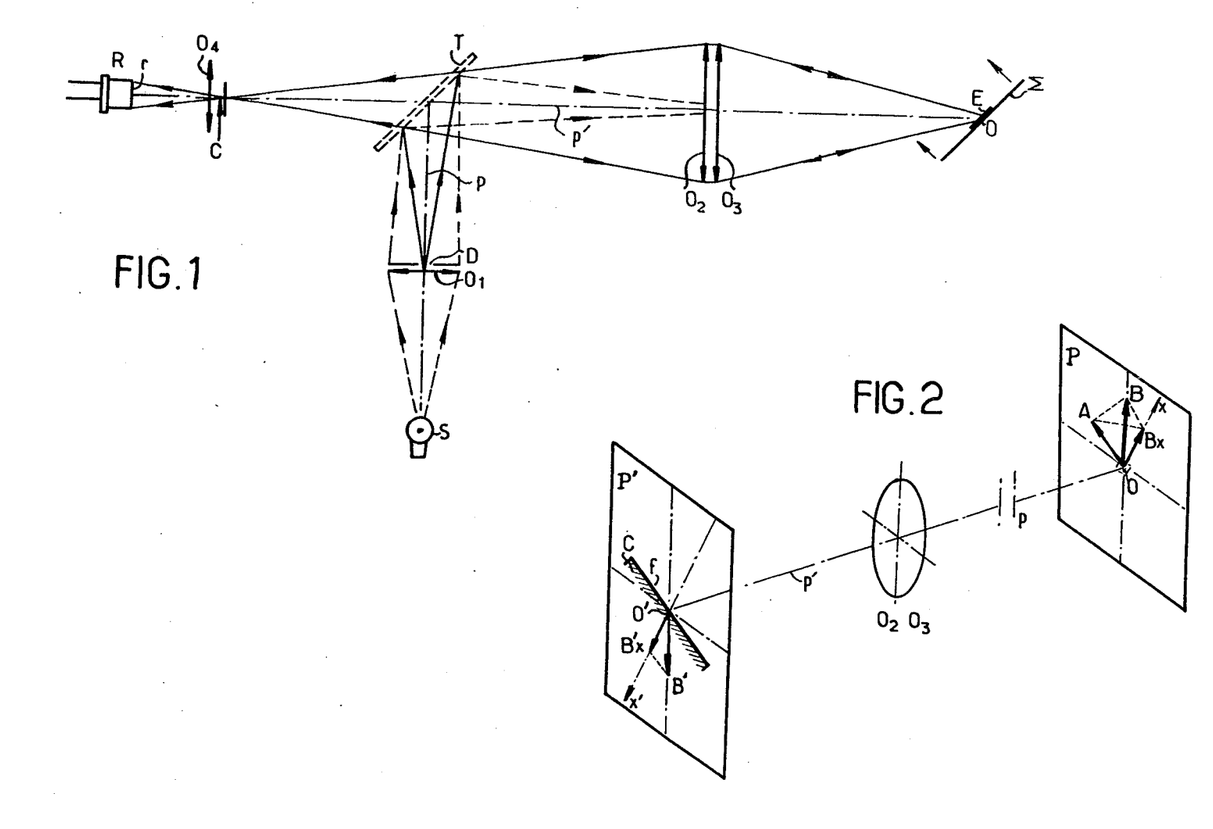
FIG. 1 is a diagram of an appliance.
FIG. 2 is a diagram with an explanatory detail sketch.

The solid body whose displacements are to be determined is represented diagrammatically by the line $\Sigma$ (FIG. 1). This solid body may be of any form. It may be mechanical component, for example a blade of turbo-engine placed on a test bench and hence subjected to periodic stresses; the appliance according to the invention is then directed to determining the displacements of various points on the component in order to draw conclusions regarding the pattern of its behavior under vibration. Such a point on the component is shown at O. On the point O, that is to say over a very small zone surrounding this point, there is bonded a piece E of a sheet endowed with catadioptric properties, that is to say that the sheet, when reflecting, returns the various incident rays which fall on it in their respective directions of incidence. Such sheets are known under the Trade-names of "SCOTCHLITE" or "TRANSFLEX". Starting from a commercially available strip or sheet, a piece is cut off accordingly and the said piece is rendered integral wih the component $\Sigma$ at the point O, for example by bonding.

In other cases there is applied on the component a suitable catadioptric layer of paint, such as known under the Trade-name of "CODIT REFLECTIVE LIQUID" , manufactured and sold by "3M".

The appliance comprises a light source S, for example the filament of an incandescent lamp. A condenser 01 forms the image of the source S on a projection objective advantageously consisting of two lenses 02-03, after reflection on a semi-transparent plane sheet T placed at 45° to the axis of the light beam. A diaphragm D is disposed against the condenser 01. The light, having traversed the diaphragm D is projected on the portion E, or retrodiffusion element, where it forms a region of uniform illumination. Adjustments are made so that this region is slightly greater in size than the retrodiffusion element E.

The constitution of the projection objective by two juxtaposed objectives 02 and 03, for example two Clairaut objectives whose foci coincide with the diaphragm D and element E respectively, makes it possible to alter the viewing distance as requisite, utilizing the objectives 03 with a different focal distance while retaining the objective 02.

By selecting as the retrodiffusion element E a catadioptric diffusion surface with high directivity such as a covering of glass balls, the element E behaves, in the viewing direction, as a source of high luminous intensity, standing out from a practically dark ground, i.e. that of the body of the component $\Sigma$.

The luminous flux retrodiffused by the element E traverses the objectives 02 and 03, the semi-transparent sheet T and the said objectives form an image of the retrodiffusion element E in the plane P' (FIG. 2) of a "knifeedge" C. The knife-edge C, whose plane is perpendicular to the optical axis $p'$, which is the common axis of the lenses 02, 03 and 04, has an arris or edge $f$. The light rays which, in the plane P', come from one side of the arris $f$, traverse the said plane and those which, in the said plane, come from the other side of the arris $f$ are occulted by the knife-edge.

A field objective 04 is placed immediately behind the knife-edge C and it ensures the optical co-ordination of the objective 02-03 and the sensitive surface $r$ of a photoelectric receiver R, or cell, designes to supply at its output side a voltage proportional to the quantity of light falling on the photosensitive surface $r$.

When the element E has a square outline the image of it formed by the objectives 02-03 in the plane P' of the knife edge C, conjugate with the plane P perpendicular to the optical axis $p$ and passing through the centre O of the element E, is a parallelogram.

Figure 3:
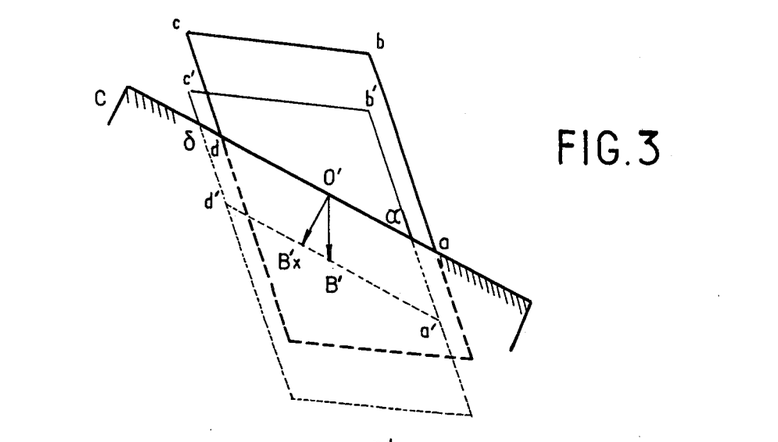
FIG. 3 is an explanatory sketch.

In one position of the component $\Sigma$, which is for example the initial position, or neutral position, the image of the element E is the parallelogram shown in solid lines in FIG. 3. Part of this parallelogram, that is to say the part bounded by $a, b, c, d$, is outside the knife-edge C; the light rays coming from the element E and arriving in the plane P' inside this part of the parallelogram traverse the said plane. On the other hand, those which arrive in the said plane in the part of the parallelogram shown in thick dashed line fall on the said opaque knife-edge C and are not transmitted.

The quantity of light which arrives on the photosensitive surface $r$ corresponds to the surface of the part $a, b, c, d$ of the parallelogram.

For a different position of the component $\Sigma$ bearing the retrodiffusion element E, the image of this latter is, for example, the parallelogram shown in thin lines. Part of this parallelogram is again outside the knife-edge; it is shown at $\alpha, b', c', \delta$; but it has a different area from the part $a, b, c, d$. The light which arrives at the photosensitive surface $r$ has an energy corresponding to the surface of the said part of the parallelogram $\alpha, b', c', \delta$. As the illumination of the parallelograms is uniform, the variation in the signal supplied by the photosensitive cell R defines the displacement of the retrodiffusionn element E and, therefore, of the component $\Sigma$ carrying it.

The displacement in space of the centre O of the retrodiffusion element E is shown by the vector OA in FIG. 2. The vector OB is the projection of the vector OA on the plane P passing through O and perpendicular to the optical axis $pp'$. The vector OB$x$ is the projection of the vector OB on an axis O$x$ lying in the plane P and at right angles of the arris $f$ of the knife-edge C. The vector OB$x$ is therefore the projection of the displacement vector OA on the axis O$x$.

The vectors O'B' and O'B'$x$ are the images of the vectors OB and OB$x$ in the plane P' conjugate with the plane P and including the knife-edge C.

From FIG. 3 it can be seen that the signal emitted by the photo-electric receiver R is proportional to the vector O'B'$x$ the extremity B'$x$ of which lies on the straight line $a'd'$ with which the straight line $ad$ coincides when the parallelogram passes from the position shown in thick line to the position shown in thin line.

The presence of the field objective 04 ensures the non-displacement of the image of the parallelogram on the photosensitive cell $r$. Thus it is always the same zone of the photosensitive surface which receives the light, and this eliminates the effect of any possible variations in the sensitivity of the surface $r$ of the photocathode comprised by the receiver R.

Figures 4, 5:
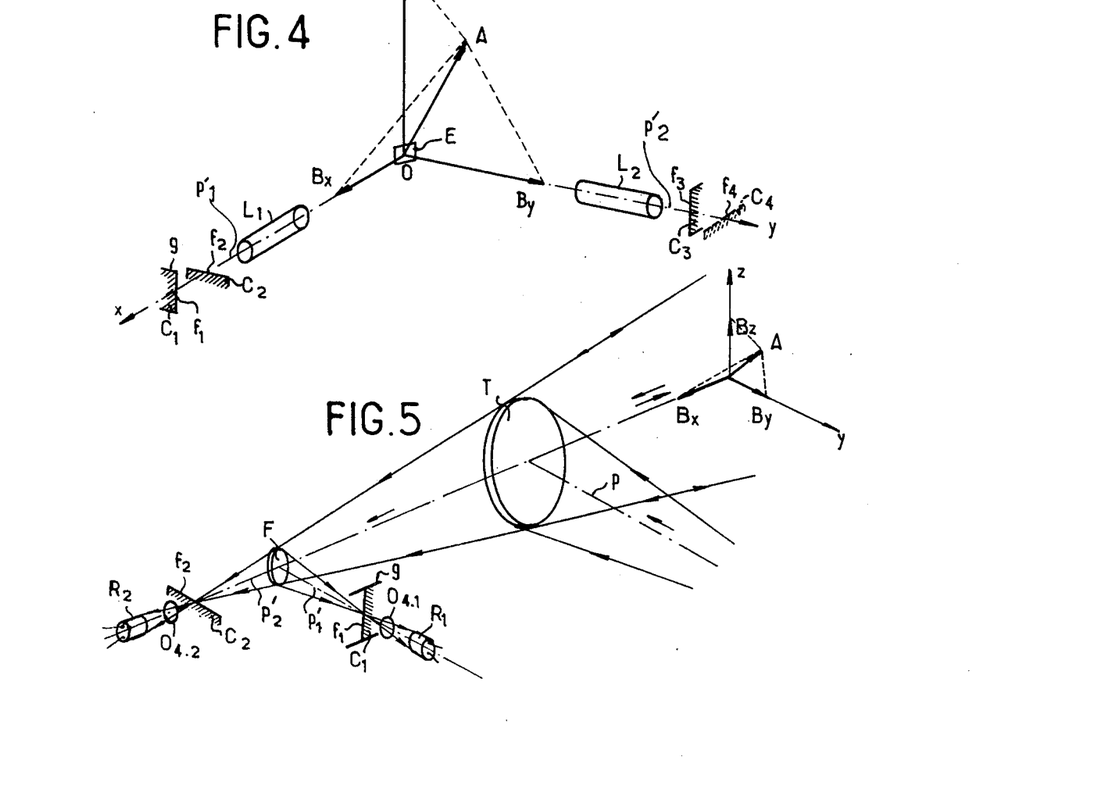
FIG. 4 is a diagram of an installation according to the invention.
FIG. 5 is an installation diagram for another form of embodiment.

Reference will now be made to FIG. 4. A retrodiffusion element E is bonded at O on the component having a "point" O whose displacement it is desired to determine. In order to determine the components of the displacement vector A along the co-ordinate axes O$x$O$y$O$z$, there is placed in alignment with one axis, for example the axis O$x$, an appliance such as has just been described, or eyepiece L1 for viewing the axis $p'$1 By means of a knife-edge C1 of the said viewing appliance there is determined the component B$y$ perpendicular to the arris $f$1 of the knife-edge C1, that is to say by an electric voltage present at the output terminals of the photo-receiver forming part of the said appliances.

By moving the knife-edge C1 in such a way as to bring its arris to $f$2, perpendicularly to $f$1, as shown at C2, the component B$z$ along the axis O$z$ is determined.

A second appliance as described above, or viewing eyepiece L2, is disposed with its axis $p'$2 aligned along the axis O$y$. There is thus determined, with a knife-edge C3 forming part of the eyepiece L2 and whose arris $f$3 is perpendicular to the axis O$x$, the component B$x$ of A. The three displacement components OA are determined in this manner.

The invention likewise provides, particularly when the retrodiffusion element is in one piece with a metallic component, for disposing a polarisation filter in front of each viewing eyepiece, the planes of polarisation being perpendicular to one another. In this way the effect of the light reflected round the retrodiffusion element is considerably reduced, which improves the contrast of the moving image and, consequently, the degree of modulation of the signal.

It is likewise possible, by means of the viewing appliance L2, to determine the component B$z$ by bringing the knife-edge C3 into the position shown at C4 with its arris $f$4 perpendicular to the axis O$z$.

In a variant form of embodiment the axes of the viewing eyepieces L1 and L2, instead of being perpendicular, form between them an angle which is not 90°.

Reference will now be made to FIG. 5. In this form of embodiment the appliance L1, or viewing eyepiece, formed as described above with reference to FIG. 1, comprises a knife-edge C2 whose arris $f$2 cuts the axis $p'$2 and is perpendicular to the axis O$z$. A field lens 04-2 projects the part of the light beam which is not occulted on to a first photo-receiver R2.

A transparent reflecting sheet F is interposed in the light beam issuing from the transparent reflecting sheet T. The part reflected along the axis $p'$1 is partly occulted by a knife-edge C1 whose arris $f$1 cutting the axis $p'$1 is perpendicular to the axis O$y$. A field lens 04-1 projects the part of the light beam which is not occulted on to the sensitive surface of a photo-receiver R1 whose output voltage is thus representative of the component B$y$ of the displacement OA.

For calibrating an appliance comprising a viewing eyepiece, a knife-edge and a receiver, a knife-edge, for example the knife-edge C1, is mounted slidingly on a platen $g$ in such a way that it is possible for it to be displaced, by direct manual control, perpendicularly to its arris $f1$. While the component $\Sigma$ remains motionless the knife-edge is displaced by a quantity $x'$. As a result there is a variation $s$ of the output signal. From this is deduced the calibration constant:

$$k = \frac{1}{\gamma} \frac{x'}{s}$$

$\gamma$ being the projection objective enlargement.

In a variant the knife-edge is rigidly connected to a drive member with linear motion, controlled by an electric current or voltage. The intensity of the current or amount of the voltage is then a measure of the knife-edge displacement amplitude.

When the appliance is used for studying a body subjected to vibrations, the calibration is advantageously effected by controlling the linear motion drive member by an alternating electric signal of greater or less frequency and associating, for example, the effective value of the calibration signal with an effective amplitude of mechanical vibration. In this way it is easier to be clear of low-frequency derivatives.

Figure 6:
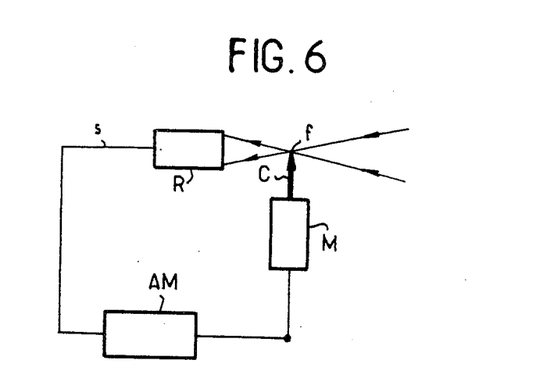
FIG. 6 is a diagram relating to a variant of the appliance shown in FIG. 1.

Reference will now be made to FIG. 6, relating to a form of embodiment identical with that described with reference to FIG. 1, but in which the knife-edge C is rigidly connected to the linearly mobile member of a motor M, the direction of drive being in the plane of the knife-edge and normal to its arris $f$. The output side $s$ of the receiver R is connected to an amplifier AM, whose output is in fact the drive factor of the motor M. There is thus obtained a controlled system which, by the displacement of the knife-edge C, tends to maintain the relative positions, on the one hand of the image of the retrodiffusion element in the plane of the knife-edge and, on the other hand, of the arris $f$ of the knife edge. The value of the voltage at the output side of the amplifier is a measure of the displacement vector component.

The transfer function of the control relationship is:

$$\frac{y}{x'} = \frac{1}{\mu} \cdot \frac{\beta}{\left(\beta + \frac{k'}{\mu}\right)} = \frac{1}{\mu} \frac{\beta \frac{\mu}{k'}}{\beta \frac{\mu}{k'} + 1}$$

in which:

$x'$ = input quantity = displacement of the image
$y$ = output quantity = increase in voltage at the motor terminals
$\beta$ = amplifier gain voltage
$\mu$ = motor transfer allowance (ratio of elongation of the knife-edge to the voltage applied)
$k'$ = transfer impedance of the receiving device (ratio of the elongation $x'$ of the knife, the image being supposed to be fixed, to the increase $s$ in the receiver output voltage) ($k' = \gamma k$).

The error transfer function is:

$$\frac{\epsilon}{x'} = 1 - \frac{\beta}{\left(\beta \frac{k'}{\mu}\right)} = 1 - \frac{\beta \frac{\mu}{k'}}{\beta \frac{\mu}{k'} + 1}$$

By selecting an amplifier whose gain $\beta$ is large in relation to $(k'/\mu)$, the error $\epsilon$ becomes small and the knife-edge follows the displacements of the image with satisfactory approximation.

The luminous intensity, the incidence of the light beam, the size and shape of the structure of the diffusion viewed object or sighting point, that is to say the retrodiffusion element, practically hardly affect the measurement at all. The calibration is independent of the operational conditions and defined by the transfer function of the drive member.

Figure 7:
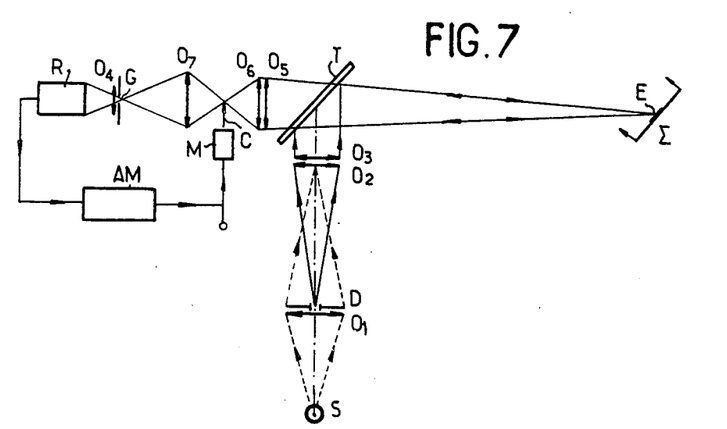
FIG. 7 is a diagram of another form of embodiment.

In the embodiment represented in FIG. 7 the projection objective 02–03 is interposed across the light beam, closer to the source than the reflecting transparent sheet T. It is then possible to interpose across the light beam retrodiffused by the element E or fixed sighting point(object) on the component $\Sigma$, farther away from the source than the reflecting transparent sheet T, an objective 05 identical with the objective 03 and which repels to infinity the image of the object or sighting point. The objective 05 is followed by an objective 06 with a short focal distance which re-forms the image of the object in the plane of the knife-edge C. The displacement of the image in it is rendered extremely small, so that in the control assembly comprising the receiver R, the amplifier AM and the motor M, a motor M can be selected which is suitable for only effecting displacements of the knife-edge over extremely small lengths. The restriction of the amplitude of the displacements of the knife-edge makes possible satisfactory functioning with comparatively low voltages for control purposes emitted by the amplifier AM.

In this connection the invention provides for the application, as motor, of a piezo-electric device permitting satisfactory functioning over a comparatively wide frequency range, or instance from 0 to 1,000 cps, without introducing time lag.

With an assembly in which the focal distance of the objective 05 is 400 mm, and that of the objective 06 is 10 mm, an amplitude of vibration of 1 mm of the object appears as a displacement of the image of 25 $\mu$.

Figure 8:
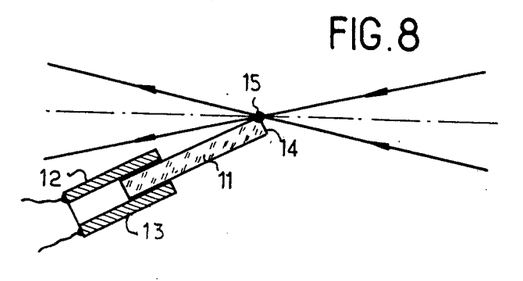
FIG. 8 is a diagram of a device forming part of an appliance according to the invention.

In the embodiment of the control device as in FIG. 8, the drive member is a piezo-electric bimetallic strip 11 and the control voltage applied to the electrodes 12 and 13 causes the expansion of one surface and the contraction of the other surface, which becomes evident in the form of a deflection of the bar. In this form of embodiment the electrodes act as gripping members, so that the end 14 of the bimetallic strip opposite the gripped end undergoes an elongation perpendicular to the direction of the bimetallic strip. The small bar 11 is oriented in a direction close to that of the luminous flux, so that its arris 15, brought into coincidence with the image of the object, in the neutral position of the component, acts as knife-edge. This avoids overloading the bimetallic strip with a knife-edge.

With a bar of 5 mm there are obtained displacements of the arris 15 acting as knife-edge of the order of 20 $\mu$ at a control voltage of 200 volts.

A control circuit has been attained having a transfer of error $$\frac{\epsilon}{x'} = 0.1$$

practically constant up to 250 cps.

To obtain a high control gain, one selects a value of magnification of the image on the knife-edge which is comparatively low. A compensation is then effected, using a photomultiplier receiver. The image of the object is then advantageously brought by an objective 07 (FIG. 7) inside an aperture G of small diameter. An objective 04 ensures the synchronization of the fixed pupil and the photocathode.

In the embodiment shown in FIG. 9 the appliance is similar to that which was described with reference to FIG. 1, so that is to say comprises a light source S, a condenser $0_1$, a diaphragm D, a transparent reflecting sheet T and objectives $0_2 0_3$. The luminous flux having traversed the diaphragm, reflected by the sheet T, traverses the objectives $0_2$ and $0_3$ and illumines the catadioptric object E (not shown in FIG. 9).

The light beam, reflected by the object E, traverses the objectives $0_3 0_2$ and forms an optical image E' of the object on the photo-cathode PC of a photo-multiplier R. The optical image E' is transformed into an electronic image I which faithfully follows the movements of the optical image of the object. The electron beam FE thus generated is accelerated and focussed, by suitable electrodes, on an inner plate having a small aperture $\omega$. The photo-multiplier R is provided with electromagnetic deflection coils $B_1$, $B_2$.

Figure 9:
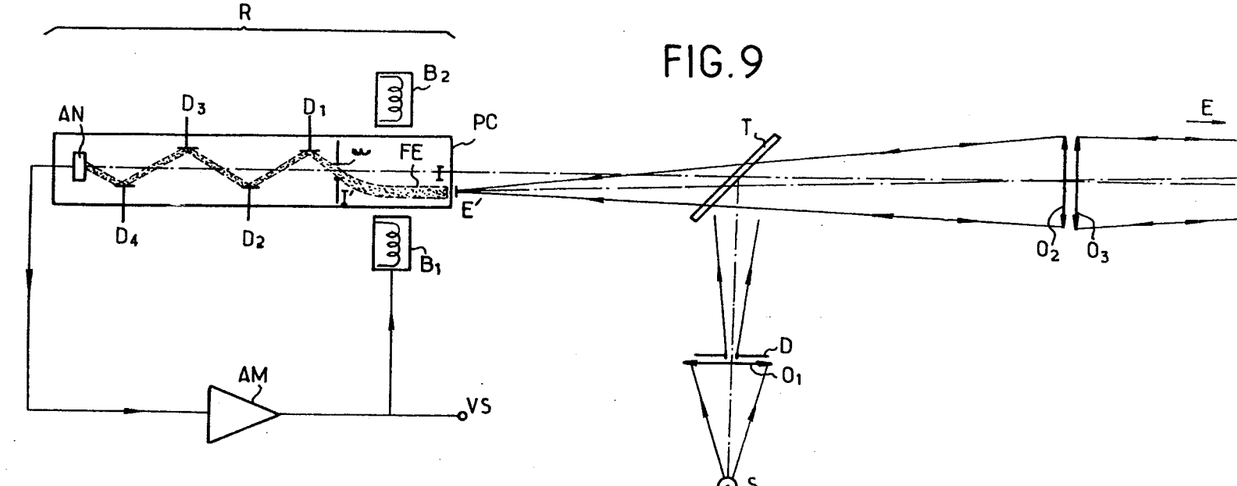
FIG. 9 is a view of part of an appliance for another form of embodiment.
Figure 10:
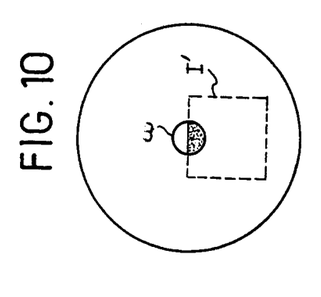
FIG. 10 is a view of a diaphragm forming part of the said appliance.

When there is no displacement of the object, the image E' is formed at the centre of the photo-cathode PC and the electron beam passes through the centre of the inner plate, in such a way that the limiting line of the electronic image I' passes through the axis of the aperture $\omega$ (FIG. 10). The part of the electron beam which traverses the aperture $\omega$ is then passed on by means of multiplier dynodes $D_1$, $D_2$, $D_3$, $D_4$ ... towards the receiving anode AN.

When thee image E' of the object undergoes a displacement, upwards or downwards, the electronic image I' undergoes a corresponding displacement, as a result of which there is a variation in the electronic flux through the aperture $\omega$, causing a variation in the output signal of the photo-multiplier R.

The output signal is applied via the amplifier AM to the coils $B_1$ and $B_2$ in such a way that the deflection of the electron beam brings the image I' to the centre of the aperture $\omega$. There is thus obtained a control circuit and the voltage VS at the output side of the amplifier is representative of the displacements of the image along the axis defined by the coils $B_1$ and $B_2$.

The addition of the two other coils (not shown), along an axis perpendicular to the axis of the coils $B_1$ and $B_2$ makes it possible similarly to measure the horizontal component of the movement.

With a single deflection type photo-multiplier it is thus possible to measure the amplitude of the displacement and its direction in a system of axes defined by the orientation of the coils $B_1$, $B_2$, and $B_3$, $B_4$.

A second appliance, identical with that represented in FIG. 9 and whose direction of sighting is at 90° to this latter, makes it possible to measure a third component of movement, not coplanar with the two preceding ones, and to attain to the orientation of the displacement vector in space.

Thanks to the deflection type photo-multiplier, the pass band of the control system is considerably enlarged towards the high frequencies, the deflection of the electron beam being deprived of inertia.

Figure 11:
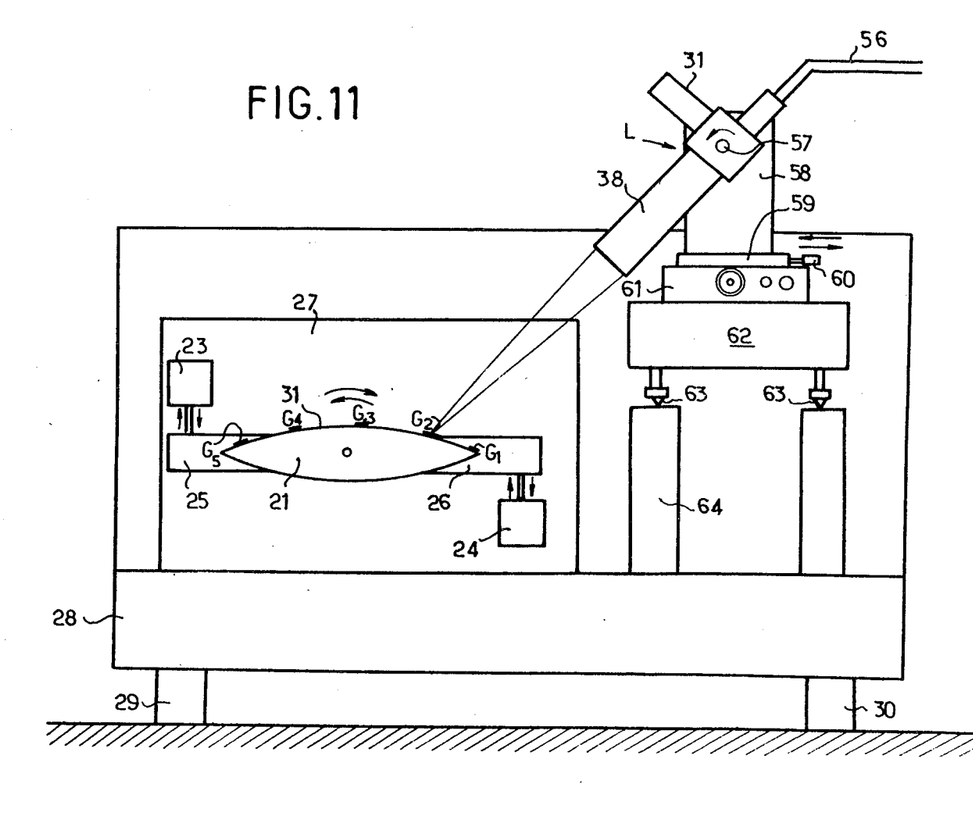
FIG. 11 is a diagrammatic view of an installation according to the invention.

Reference will now be made to FIG. 11. The component being investigated is a turbo-engine blade 21 with a twodimensional profile and of low thickness. It is agitated in a torsional manner by two agitators 23 and 24 acting via clamping members 25 and 26 gripping the blade near its longitudinal edges.

The apparatus 27 comprising the blade and its agitators is supported on a concrete base 28 which in turn is supported on the ground via anti-vibration support members 29 and 30.

There is bonded on the surface 31 of the blade, in the longitudinal direction of the said blade, catadioptric strips G1, G2, G3, G4, G5. These retrodiffusion strips are in an adhesive reel with glass balls, as sold commercially under the name "Transflex".

Figure 12:
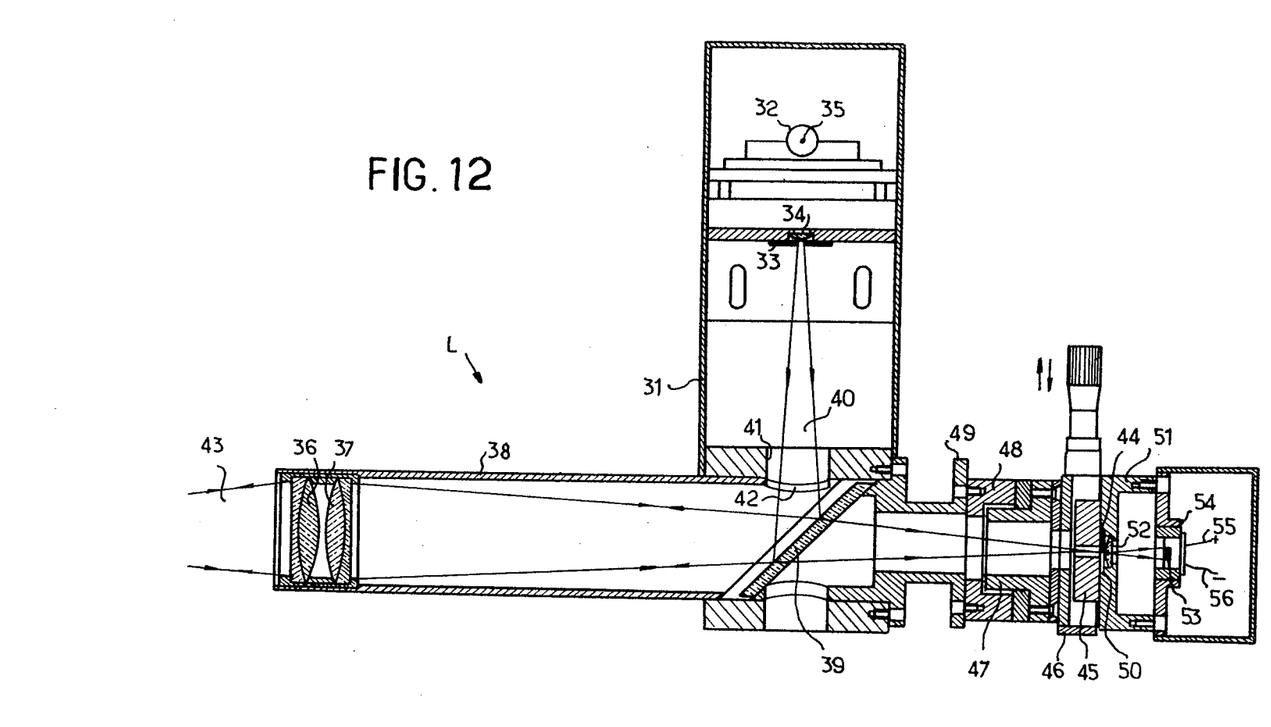
FIG. 12 is a view in section of a part of an installation as shown in FIG. 11.

The eyepiece L, of the type shown in FIG. 12, has its axis in a plane perpendicular to the generatrices of the blade and directed substantially with an incidence of 45° in respect of the normal to the centre plane of the blade. The eyepiece L comprises a first body 31 accommodating towards one of its ends a light source consisting of an incandescent lamp 32; the diaphragm 33 bounds a square aperture two of whose sides are parallel to the generatrices of the blade and the other two are at right angles to them. A lens 34 co-ordinates the filament 35 of the lamp 32 with the pupils of the Clairaut objectives 36 and 37 carried by a principal body 38 whose direction is perpendicular to that of the first body. The body 38 comprises the transparent reflection sheet 39 receiving the beam 40 emitted by the body 31 through two facing apertures 41 and 42 of the said body 31 and the body 38. The beam 43 supplied by the Clairaut objectives is directed towards the blade and the retrodiffused beam after passing through the sheet 39 forms an image of the sighting point in the plane of the knife-edge 44. This latter is rigidly connected to a support member of the knife-edge 45 carried by a translatory platen 46 which in turn is carried by a rotary platen 47 seated inside a case 48 facing a flange 49 forming part of the case 38. The knife-edge 44 is disposed in a recess 50 in a case 51 carrying the lens 52 conjugating the pupil of the Clairaut objectives 36 and 37 with the photo-electric cell 53 of a receiver 54 whose output terminals 55 and 56 supply the signal sought.

The eyepiece is supported so as to be able to rotate round a pivot 57 (FIG. 11) forming part of a pedestal 58 supported by a platen 59 with means 60 for moving the said platen in different directions parallel to the plane of the Figure, in respect of a second platen 61, which in turn, is mounted on a base 62 in such a way as to be capable of being displaced in relation to this base in either direction perpendicularly to the direction of displacement of the platen 59 in respect of the platen 61. The base 62 rests by tips 63 on pillars 64 erected on the support member 28.

Figure 13:
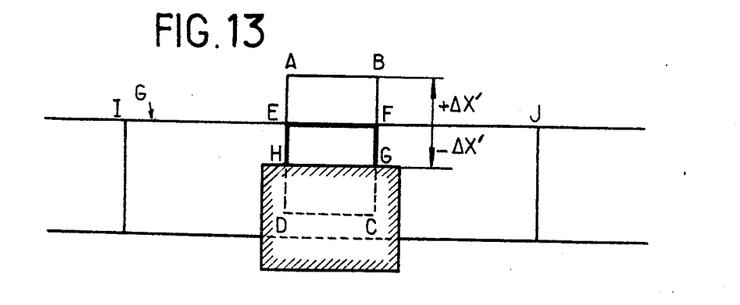
FIG. 13 is an explanatory detail sketch.

In FIG. 13 is shown the position of the image ABCD of the diaphragm on a retrodiffusion strip G. In the plane of the knife-edge, during the vibration of the blade, everything happens as though the knife-edge were fixed, and also the image of the retroduffusion strip G, only the image ABCD of the diaphragm being mobile.

Adjustments and controls are carried out so that in the starting position the image of the diaphragm straddles an edge of the strip, for instance the edge IJ, and this latter defines, on either side of the segment EF lying between the edges AD and BC, rectangles of the same height, AX', and respectively ABEF and EFHG. There is thus obtained maximum travel without optical decresting of the light signal. The luminous intensity of the source is adjusted so that the receiver output voltage is zero in the median position.

When it is intended to subject the blade to vibrations of very large amplitude, the projected rectangle is to a large extent uncovered, in such a way that the dimension AH substantially corresponds to the maximum amplitude from peak to peak, the luminous intensity of the light source is reduced.

For low amplitudes, on the contrary, the projected image is reduced in height and the luminous intensity is increased to arrive again at the same intensity of the electric signal.

Figure 14:
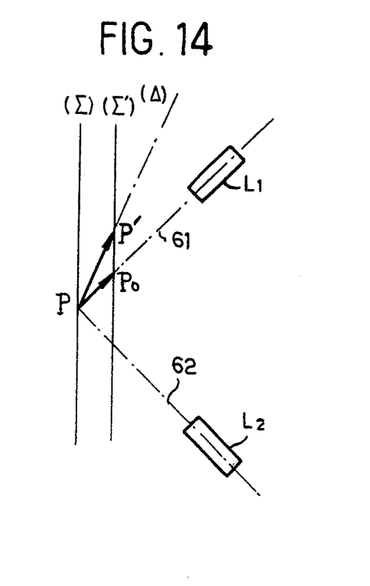
FIGS. 14 and 15 are diagrams illustrating the arrangement of another form of embodiment of an installation according to the invention.

In the installation shown diagrammatically in FIG. 14, the component is not provided with a retrodiffusion element, but the direction of its displacement is known — it is the direction marked Δ. The determination of the displacement of a point P on the component Σ is then obtained by directing towards the point P the axis 61 of a first eyepiece L1 and the axis 62 of a second eyepiece L2, the axis 61 and 62 being perpendicular to one another. The eyepiece 61 comprises means for projecting on the point P the image of its diaphragm. It is without the knife-edge and the receiver. On the other hand the eyepiece L2 is without the light source and also without the diaphragm. It makes possible, during displacement of the component from Σ to Σ′, the determination, by the voltage which it supplies at the output side of its receiver, of the size of the vector P—Po. This determination makes it possible, taking into account the knowledge of the direction Δ of the displacement of the component, to determine the size of the vector PP′.

Figure 15:
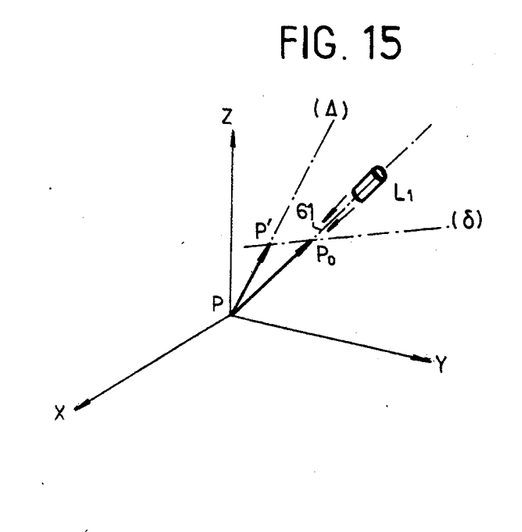

A geometrical determination is shown diagrammatically in FIG. 15. P′ is the point of intersection of Δ with the straight line δ which is itself the line of intersection of the plane Σ′ with the plane defined by the straight line Δ and the axis of illumination 61 of the eyepiece L1.

Figures 16, 17, 18:
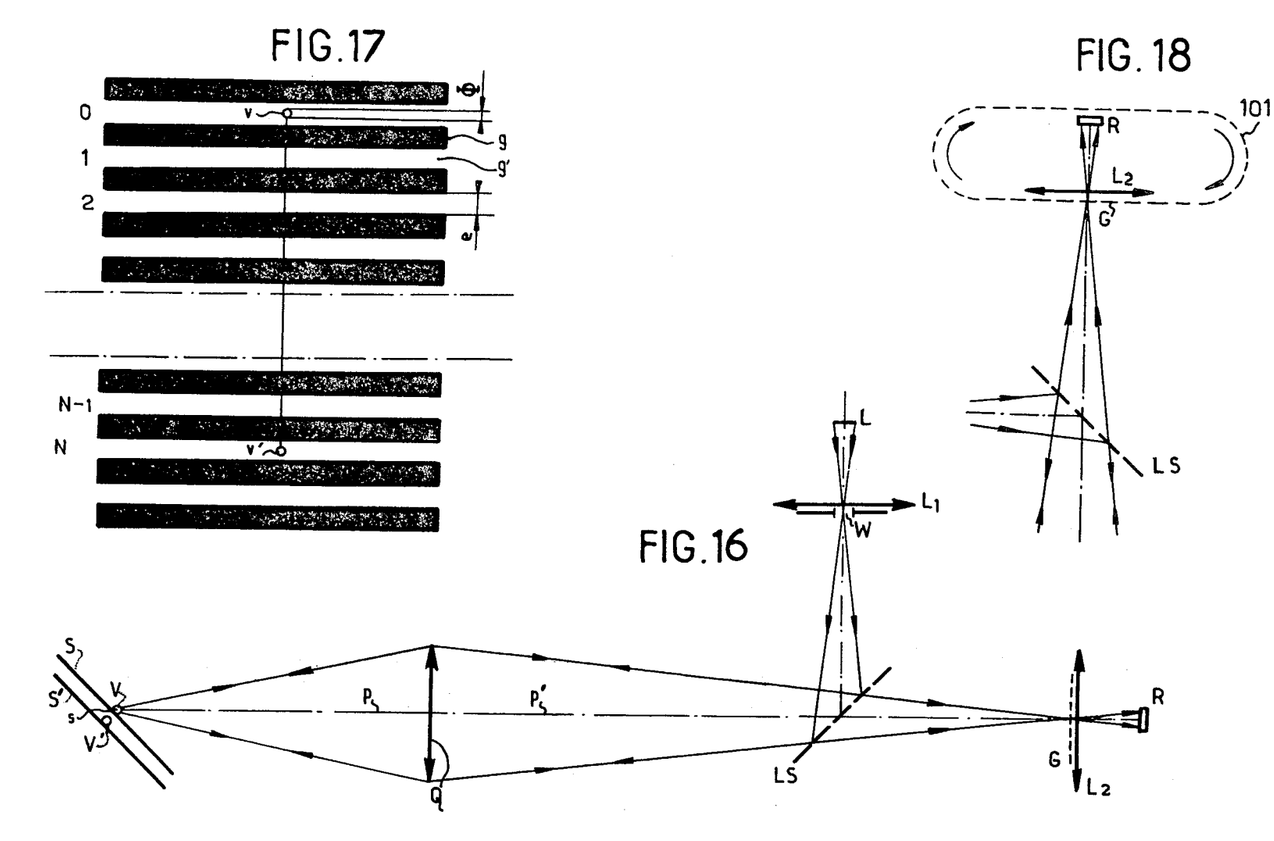
FIG. 16 is a diagram of another form of embodiment of an appliance according to the invention.
FIG. 17 is a diagrammatic view in elevation of a grating.
FIG. 18 is a similar diagram to that of FIG. 16, but for a variant.

Reference will now be made to FIG. 16. It is desired to investigate the displacement of a point s on a mechanical component S, two positions of which are represented in the Figure by the parallel straight lines S and S′. At the point s there is bonded on a small catadioptric element V consisting of a glass ball, or ball of other transparent material, of a diameter of about a tenth of a millimeter. The axis pp′ of an objective Q passes through the catadioptric element V and is distinct from the normal at s to the surface S of the component. A light source L is placed behind a diaphragm W arranged with a circular orifice and at the back of which there is disposed a lens L1 whose axis is perpendicular to the axis pp′ of the objective Q. Light passing through the diaphragm W is reflected by the transparent reflecting sheet LS passing through the point of intersection of the axis pp′ and the axis of the lens L1 and at an angle of 45° to these axis. The objective Q forms on the surface S the image of the diaphragm W, not necessarily circular, and which is considerably larger than the catadioptric element V, for example is of the order of some millimeters. The lens L1 conjugates the light source L with the pupil of the objective Q.

Light reflected by the catadioptric element V is focussed by the objective Q, after passing through the transparent reflecting sheet LS, in the plane of a grating G. This latter is formed by an alternating arrangement of opaque bands g and transparent bands g′, equal in width (FIG. 17). A lens L2 backing on to the grating G co-ordinates the pupil of the objective O with the photosensitive surface of a receiver R.

If, when the component is in the position shown at S, the little luminous dot or light spot v which forms in the plane of the grating G is on a transparent region g″ as shown in FIG. 17, the receiver R supplies a voltage at its output side. If, vice versa, the little luminous dot is on an opaque band, the receiver does not supply voltage.

If the component moves from the position shown at S to the position shown at S′, the luminous dot in the plane of the grating G moves, for example, from the position v to the position v′, passing successively across alternate transparent and opaque bands. As a result at the output of the receiver R there is a substantially sawtooth voltage, starting from which it is possible to determine the characteristics of the displacement of the surface S.

The diameter of the luminous dot in the plane of the grating G depends on the opening out of the beam supplied by the objective Q and likewise on the diameter of the ball V. The dot is in fact the reflection of the pupil of the objective Q supplied by the ball V.

The width of the bands g, g′ is selected in dependence on the diameter of the light spot formed in the plane of the grating G.

The appliance is well adapted to the measurement of displacements of considerable amplitude with a high degree of accuracy.

With a grating having a pitch of 1/100th mm, an elongation of 10 mm gives rise to 1,000 electric pulses.

Such an appliance likewise permits the easy determination of the characteristics of a sinusoidal vibration of a component.

In one embodiment the grating G is mounted on a support member comprising means for its adjustment in orientation in a movement of rotation round the optical axis of the beam. In this way it is possible to orient the bands in such a way that they are perpendicular to the displacement of the light spot, which makes itself apparent by a maximum value of the signal supplied by the receiver.

In the embodiment shown in FIG. 18, the grating G, constituted by a succession of opaque and transparent bands, is formed on a film or foil 101 moving with uniform motion, for example along an endless circuit. As long as the surface S is motionless the frequency of the signal supplied by the receiver R placed behind the grating G, thus animated with a uniform motion, is constant. The displacement of the catadioptric element such as the ball V modulates the said signal and this modulation is an information datum relating to the movement of the surface S.

The appliance makes possible, in this embodiment, the study of movements of components in non-sinusoidal vibration, for example when subjected to sawtooth excitation.

The invention provides for equipping the component, not with a single catadioptric element such as a ball, but with a multiplicity of catadioptric elements as presented by a coat of paint of the type available commercially under the name of "Codit Reflective Liquid" of the film 3M, or by a piece of tape carrying side by side a large number of balls such as are available commercially under the name of "TRANSFLEX" or "SCOTCHLITE". The quantity of light reaching the receiver is thus increased.

We claim:

1. A system for the determination of the displacement along a direction of a "point" on the surface of a solid body comprising:
   a small element whose outer face is constituted of a catadioptric retroreflecting material, said element being applied to the "point" whose displacement is to be measured; an appliance which includes:
   projecting means for projecting onto said element a stationary light beam non-parallel to said direction;
   occultation means in the path of reflected light off of said element concealing a portion of the reflected light which arrives to one side of a given plane while passing light which arrives to the other side of the given plane;
   photosensitive means to the rear of said occultation means for receiving the non-occulted portion of the reflected light; and
   measuring means adjacent to said photosensitive means for measuring the quantity of light occulted by said occultation means.

2. An appliance as claimed in claim 1, wherein said occultation means comprises a knife-edge which is positioned at said given plane and further comprising means for displacing the knife-edge in its own plane to change position of said given plane.

3. An appliance as claimed in claim 2, further comprising means for displacing the knife-edge in a translatory movement and means for displacing the knife-edge in a rotary movement.

4. An appliance as claimed in claim 1, wherein said measuring means comprises a first receiver cooperating with said occultation means which comprises a first knife-edge, and further including a second receiver whose axis is perpendicular to that of said first receiver and additional occultation means in the path of reflected light of said element which arrives to one side of an additional plane while passing light which arrives to the other side of said additional plane, said additional occultation means comprises a second knife-edge whose axis is perpendicular to that of said first knife edge and said given and said additional planes are perpendicular.

5. A system for the determination of the displacement of a "point" on the surface of a solid body as claimed in claim 28 including the appliance therein as a first appliance, particularly for studying vibration modes, comprising additionally a second appliance of substantially identical construction, the axis of observation of said first appliance being directed along a component axis of the movement of the body and the axis of observation of said second appliance being directed along an axis perpendicular to the axis of observation of the first appliance.

6. An apparatus as claimed in claim 5, wherein in one appliance at least one knife-edge may be brought into two positions for which the directions of its axis are perpendicular to one another.

7. An apparatus as claimed in claim 5, for the study of a blade of a turbo-engine, wherein the retrodiffusive bands are disposed along the generatrices of the blade.

8. A system according to claim 1 wherein said projecting means comprises:
   a light source;
   a diaphragm between said light source and said element; and
   optical conjugation means between said diaphragm and said light source for optical co-ordination of said diaphragm and said element.

9. A system according to claim 8 further including optical conjugation means between said occulation means and said element for optical co-ordination of said element and said occulation means.

10. A system according to claim 8 further comprising a transparent reflecting sheet interposed in the lighting flux created by said light source illuminating said element.

11. A system according to claim 1 wherein said occulation means is a straight-edged blade.

12. A system according to claim 1 further including a field lens between said occulation means and said photosensitive means.

13. An appliance as claimed in claim 1, further comprising in front of said measuring means a grating with alternate transparent and opaque elements.

14. An appliance as claimed in claim 13, where the elements of the grating are parallel bands or strips of the same width.

15. An appliance as claimed in claim 14, wherein the grating is carried by a film in movement in a direction perpendicular to the direction of the bands.

16. An appliance as claimed in claim 15, wherein the grating is adjustable in rotation around the axis of the optical beam which falls on it.

17. A method for the determination of the displacement along a direction of a "point" on the surface of a solid body comprising the steps of:
   applying a small catadioptric element to the outer surface of the body for effective retroreflection therefrom;
   projecting a stationary incident light beam onto said element parallel to said direction;
   retro-reflecting said light beam, as a reflected beam off said element, along a path parallel to that of said incident light beam;
   occulting said reflected beam which arrives to one side of a given plane while passing light which arrives to the other side of the given plane; and
   determining the quantity of light of the non-occulted portion of said reflected beam by measurement while the body is vibrated and while it is not vibrated and comparing the results under these conditions.

18. An installation for determining small displacements of a "point" of a body parallel to a given direction, comprising:
   affixed on said "point" a small element, the outer face of which is constituted of a catadioptric retroreflecting material and reflects light rays non-perpendicular to said body along the impinging direction;
   means for projecting onto said element a stationary light beam along a direction different from said given direction;
   an opaque plane screen whose edge is located in the plane of the image of said element given by the beam resulting from the reflection, the edge of which intersects said image; and
   a photoelectric cell located in the portion of the reflected beam non-occulted by said screen.

19. An installation according to claim 18, wherein the opaque screen is a succession of parallel strips.

20. An installation according to claim 19, comprising means for modifying the direction of the parallel strips.

21. An installation according to claim 19, wherein the parallel strips are present on a film movable according to a uniform movement.

* * * * *